United States Patent [19]

Brand et al.

[11] Patent Number: 4,828,082

[45] Date of Patent: May 9, 1989

[54] CONTROL METHOD FOR PROTECTING A VISCOUS CONVERTER CLUTCH IN A MOTOR VEHICLE DRIVETRAIN

[75] Inventors: Gary J. Brand, Irvine, Calif.; David C. Poirier, Troy, Mich.; Peter Jarzyna; John C. Haraf, both of Livonia, Mich.; Joseph M. Tolkacz, Warren, Mich.; Robert C. Simon, Jr., Novi, Mich.; Dale L. Phillips, Dearborn, Mich.; Richard C. Mamolen, Brighton, Mich.; George T. Stephens, Livonia, Mich.; Richard A. Marsh, Birmingham, Mich.

[73] Assignee: General Motors Corporation, Detroit, Mich.

[21] Appl. No.: 158,187

[22] Filed: Feb. 19, 1988

[51] Int. Cl.$^4$ .................... F16D 39/00; F16D 43/284; F16H 45/02

[52] U.S. Cl. .................................... 192/3.3; 192/3.25; 192/3.26; 192/3.28; 192/3.29.3.31; 192/103 F

[58] Field of Search ............... 192/3.25, 3.26, 3.28, 192/3.29, 3.3, 3.31, 103 F

[56] References Cited

U.S. PATENT DOCUMENTS 4,317,510   3/1982   Staub, Jr. .................... 192/58 B
4,496,034   1/1985   Bopp .............................. 192/3.28
4,582,185   4/1986   Grimes et al. ................. 192/3.3
4,660,697   4/1987   Yoneda et al. ............. 192/0.052

Primary Examiner—Rodney H. Bonck
Assistant Examiner—Andrea Pitts
Attorney, Agent, or Firm—Mark A. Navarre

[57] ABSTRACT

Potentially damaging operation of a viscous converter clutch (VCC) is detected in relation to the slippage thereacross. The slippage is compared with a reference slip value indicative of excessive VCC slippage to develop a net overslip indicator. The value of the net overslip indicator changes in the direction of a first limit value so long as the detected slip is at least as great as the reference slip, and in the direction of a second limit value so long as the detected slip is less than the reference slip. When the net overslip indicator reaches the first limit value, the friction clutch is disengaged to release the VCC. According to a first embodiment, the transmission fluid temperature at the time of such deactivation is measured and stored, and the VCC is reactivated when transmission fluid temperature falls below the stored temperature, assuming other criteria for activation are also met. According to a second embodiment, the VCC is reactivated a predetermined time after its deactivation and measurement of the transmission fluid temperature is not required.

3 Claims, 5 Drawing Sheets

4,828,082

CONTROL METHOD FOR PROTECTING A VISCOUS CONVERTER CLUTCH IN A MOTOR VEHICLE DRIVETRAIN

This invention relates to an electronic control for a motor vehicle drivetrain employing an electrically actuated viscous (fluid shear) converter clutch, and more particularly to a method of protecting the clutch from damage under extreme operating conditions.

BACKGROUND OF THE INVENTION

Viscous (fluid shear) clutches have been employed in connection with the torque converter of motor vehicle drivetrains to improve drivetrain efficiency. In such applications, the viscous clutch is referred to as a viscous converter clutch or VCC. The torque converter is connected between the engine and transmission and defines a relatively high slip torque transmission path therebetween. The VCC is selectively connected in parallel with the torque converter via engagement of a friction clutch to define an alternate, relatively low slip, torque transmission path between the engine and transmission.

Engagement of the friction clutch is generally controlled in accordance with the operating conditions of the drivetrain. When the friction clutch is disengaged, engine torque is transmitted to the transmission through the torque converter. When the friction clutch is engaged, engine torque is transmitted to the transmission through the friction clutch and the VCC. The relatively low slip of the activated VCC improves drivetrain efficiency, while maintaining a smoothing effect on the transmission input torque for good drivability.

The slip across an activated VCC exhibits a characteristic variation as a function of the input (engine) speed and torque and the viscosity of the internal VCC fluid. The viscosity of the fluid varies with its temperature, which in turn, depends on the internally generated fluid shear and the ambient oil temperature surrounding the clutch.

Under certain heavy load conditions, such as when the vehicle is pulling a trailer up a long grade in high ambient temperatures, the fluid in the VCC may overheat. This is potentially harmful to the clutch since the reduced viscosity of the fluid permits increased slippage, and therefore, further heating of the fluid. In extreme cases, the fluid may become chemically degraded and clutch damage may occur.

Ideally, one might avoid damage to the clutch under the above described operating conditions by simply measuring the temperature of the clutch fluid and disengaging the friction clutch when the measured temperature exceeds a reference temperature. However, this is a rather expensive and impractical approach due to the clutch environment.

SUMMARY OF THE PRESENT INVENTION

The present invention is directed to an improved method of operation for protecting the VCC of a motor vehicle drivetrain which does not require measurement of the temperature of the viscous fluid. According to this invention, potentially damaging operation of the VCC is detected in relation to the slippage thereacross. The slippage is compared with a reference slip value indicative of excessive VCC slippage to develop a net overslip indicator. The value of the net overslip indicator changes in the direction of a first limit value so long as the detected slip is at least as great as the reference slip and in the direction of a second limit value so long as the detected slip is less than the reference slip. When the net overslip indicator reaches the first limit value, the friction clutch is disengaged to release the VCC.

According to a first embodiment, the ambient temperature surrounding the VCC at the time of such deactivation, as judged by the transmission fluid temperature, is measured and stored. Thereafter, the VCC is reactivated when transmission fluid temperature falls below the stored temperature, assuming other criteria for activation are also met. According to a second embodiment, the VCC is reactivated a predetermined time after its deactivation, and measurement of the transmission fluid temperature is not required.

The parameters required to mechanize the above method are easily measured and may be already available depending on the sophistication of the drivetrain controls. As a result, the method of this invention provides practical and relatively inexpensive protection for the VCC.

BRIEF DESCRIPTION OF THE DRAWINGS

FIG. 3 depicts a main loop program, and FIGS. 4-5 depict VCC-related routines executed under the direction of the main loop program.

DETAILED DESCRIPTION OF THE DRAWINGS

Figure 1:
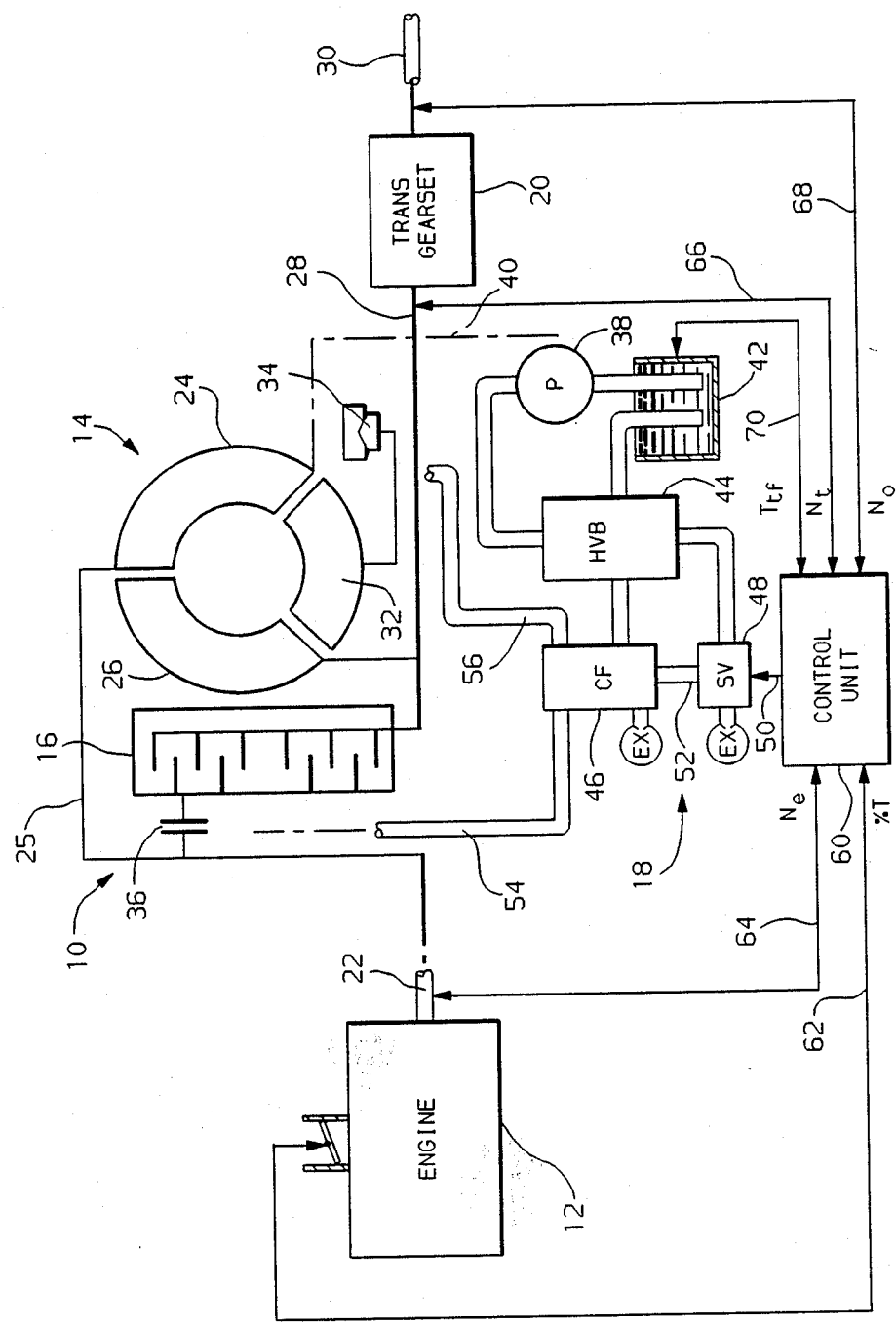
FIG. 1 is a schematic diagram of a motor vehicle drivetrain including a VCC and a computer-based control unit for carrying out the control of this invention.

Referring to FIG. 1, the reference numeral 10 generally designates a motor vehicle drivetrain comprising a throttled internal combustion engine 12, a fluidic torque converter 14, a VCC 16, a power transmission hydraulic control circuit 18 and a multiple speed ratio planetary gearset 20. The output shaft 22 of engine 12 drives the input member 24 (impeller) of torque converter 14 through torque converter input shell 25. The output member (turbine) 26 of torque converter 14 drives the input shaft 28 of transmission gearset 20, and the output shaft 30 of gearset 20 drives a pair of wheels (not shown) for propelling the vehicle. The stator 32 of torque converter 14 is grounded through a one-way device 34. A friction clutch 36 is engageable to connect the VCC 16 between the input shell 25 and output member 26 of torque converter 14.

The hydraulic control circuit 18 may be a conventional collection of control elements and circuits as, for example, is described in the 440 THM Service Manual, published by the Hydra-matic Division of General Motors Corporation. Pertinent to the present invention, the hydraulic control circuit 18 includes a positive displacement pump (P) 38, a fluid reservoir 42, a hydraulic valve body (HVB) 44, a converter feed valve (CF) 46 and a VCC solenoid valve (SV) 48. The pump 38 is mechanically driven by the impeller 24, as indicated by the broken line 40. The pump 38 supplies fluid from the reservoir 42 to a hydraulic valve body (HVB) 44, which in turn, regulates the fluid pressure and directs fluid to the converter feed valve (CF) 46, the VCC solenoid valve (SV) 48, and various other transmission control elements, cooling and lubrication systems (not shown). Exhaust fluid from the various elements is returned to the reservoir 42 as indicated.

The solenoid valve 48 is electrically energizable via conductor 50 for selectively supplying control pressure to converter feed valve 46 via fluid passage 52. With the solenoid valve 48 deenergized, the converter feed valve 46 assumes a converter mode in which hydraulic fluid is supplied to torque converter 14 via fluid passage 54 and returned via fluid passage 56. The fluid flow between input shell 25 and the VCC 16 disengages the friction clutch 36, and engine output torque is transmitted to the gearset 20 via the torque converter 14.

With the solenoid valve 48 energized, the control pressure thereby generated in fluid passage 52 assumes a VCC mode in which hydraulic fluid is supplied to torque converter 14 via fluid passage 56. The fluid now pushes the VCC 16 toward the input shell 25, engaging the friction clutch 36. In this state, the VCC is said to be activated and engine output torque is transmitted to the gearset 20 via friction clutch 36 and VCC 16.

Energization of the solenoid valve 48 is controlled by the computer-based control unit 60 via conductor 50 in a predetermined manner in response to various operating parameters of the drivetrain 10. Such parameters are sensed with conventional transducers and provided as inputs to control unit 60 via conductors 62–70. Such inputs include the engine throttle position (%T) signal on conductor 62, the engine speed signal ($N_e$) on conductor 64, the turbine speed signal ($N_t$) on conductor 66, the gearset output speed signal ($N_o$) on conductor 68, and the transmission fluid temperature signal ($T_{tf}$) on conductor 70. The control unit 60 may be mechanized with a conventional state-of-the-art microcomputer controller, including a central processing unit, memory and input/output devices.

As indicated above, activation of VCC 16 is scheduled in relation to various vehicle and drivetrain operating parameters to provide improved drivetrain efficiency without significant degradation of drivability. Such parameters may include vehicle braking, engine speed and load, and engine coolant temperature. When the enabling conditions are met, the solenoid valve 48 is energized to activate the VCC; when the disabling conditions are met, the solenoid valve 48 is deenergized to release the VCC.

The present invention is directed to a control method for protecting the VCC during heavy load operating conditions which might otherwise result in overheating of the VCC fluid and damage to the VCC. Significantly, the control of this invention does not require measurement of the temperature of the VCC fluid. Instead, potentially damaging conditions are detected in relation to the cumulative slip across the VCC during its engagement. If the slip S is at least as great as a reference slip value indicative of excessive VCC slippage, the value of a net overslip indicator (referred to herein as a delay timer, DLY TMR) increases toward a calibrated limit. If the slip S is less than the reference slip, the value of the overslip indicator decreases toward zero. When the net overslip indicator reaches the limit, the solenoid valve 48 is deenergized to deactivate VCC 16.

According to a first embodiment, the transmission fluid temperature $T_{tf}$ at the time of such deactivation is stored, and the VCC is not reactivated until the transmission fluid temperature falls below the stored temperature value, less a hysteresis term $T_{hys}$. According to a second embodiment, measurement of the transmission fluid temperature is not required, and the VCC is reactivated a predetermined time after its deactivation.

Figure 2:
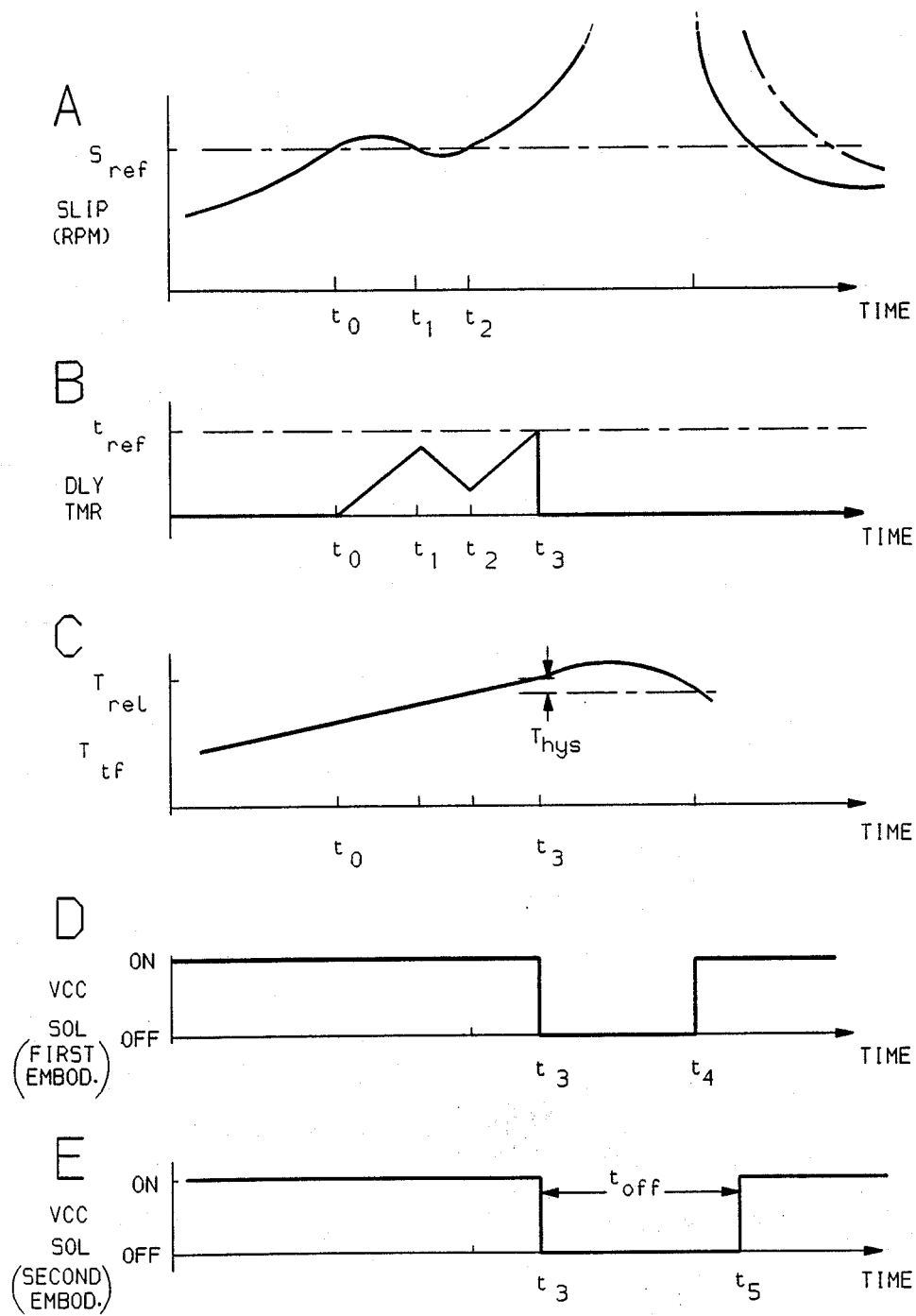
FIG. 2 graphically depicts the operation of the drivetrain of according this invention.

The operation of this invention during a period of extended heavy loading is graphically illustrated in FIG. 2, where the VCC slip S, the delay timer DLY TMR, the transmission fluid temperature $T_{tf}$ and the solenoid valve energization state are depicted on a common time base in Graphs A–E. Graph D depicts the solenoid state according to the first embodiment, and Graph E depicts the solenoid state according to the second embodiment.

In the course of the period of heavy loading with the VCC activated, the slip speed S across VCC 16—that is, ($N_e$—$N_t$)—gradually increases as indicated in Graph A. As indicated above, such increase is due to a temperature related reduction in the viscosity of the VCC fluid. When the slip S exceeds the calibrated reference slip $S_{ref}$ at time $t_0$, the DLY TMR count begins increasing at a steady rate, as seen in Graph B. If the slip S falls below the reference slip $S_{ref}$ before the count in DLY TMR reaches the reference interval $t_{ref}$, as at time $t_1$, the DLY TMR count begins decreasing as seen in Graph B, and no action is taken. However, if the slip S remains above the reference slip $S_{ref}$, as after time $t_2$, the DLY TMR count eventually reaches the reference interval $t_{ref}$. In the example of FIG. 2, this occurs at time $t_3$, triggering a release of the VCC 16, as indicated in Graphs D and E.

In a control according to the first embodiment of this invention, the transmission fluid temperature at the onset of a slip release—that is, at time $t_3$—is saved as $T_{rel}$, as seen in Graph C. In such case, the VCC 16 is only reactivated after the transmission fluid temperature $T_{tf}$ falls below the release temperature $T_{rel}$ less a hysteresis term $T_{hys}$, graphically depicted in Graph C. In the example of FIG. 2, this occurs at time $t_4$, triggering a reactivation of the VCC 16, as indicated in Graph D.

In a control according to the second embodiment of this invention, the transmission fluid temperature is not required, and the VCC 16 is reactivated a predetermined time after the VCC release. Such time is designated as $t_{off}$ and results in a reactivation of the VCC 16 at time $t_5$, as indicated in Graph E.

Figure 3:
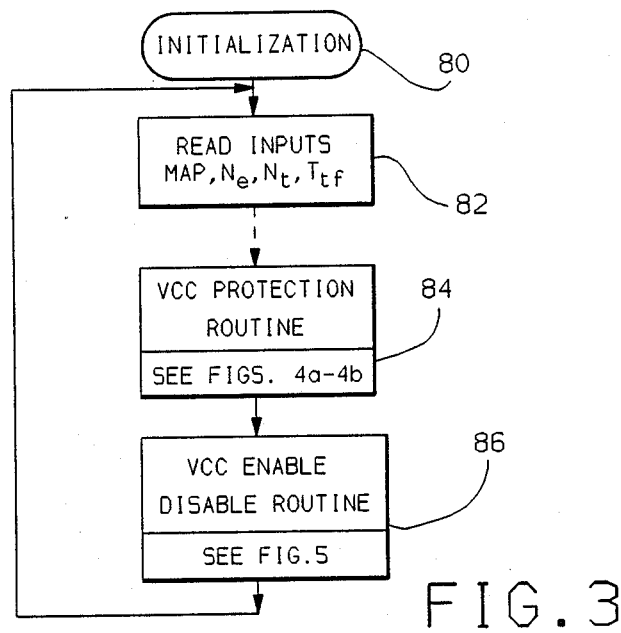
FIGS. 3, 4a, 4b and 5 are flow diagrams representative of computer program instructions executed by the control unit of FIG. 1 in carrying out the control of this invention.
Figure 5:
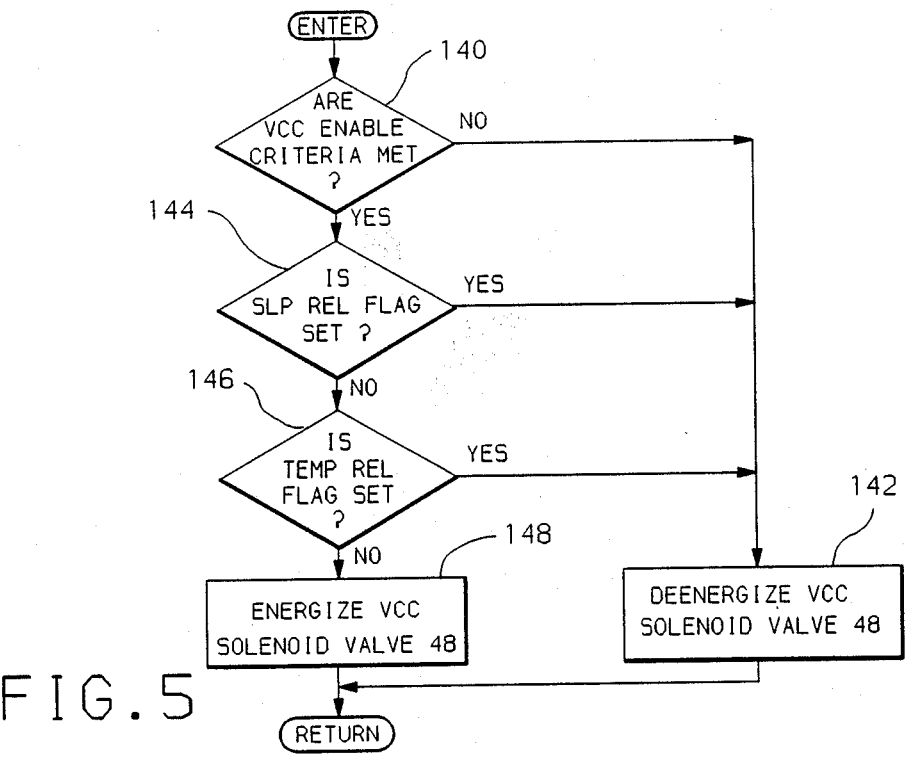
Figure 4A:
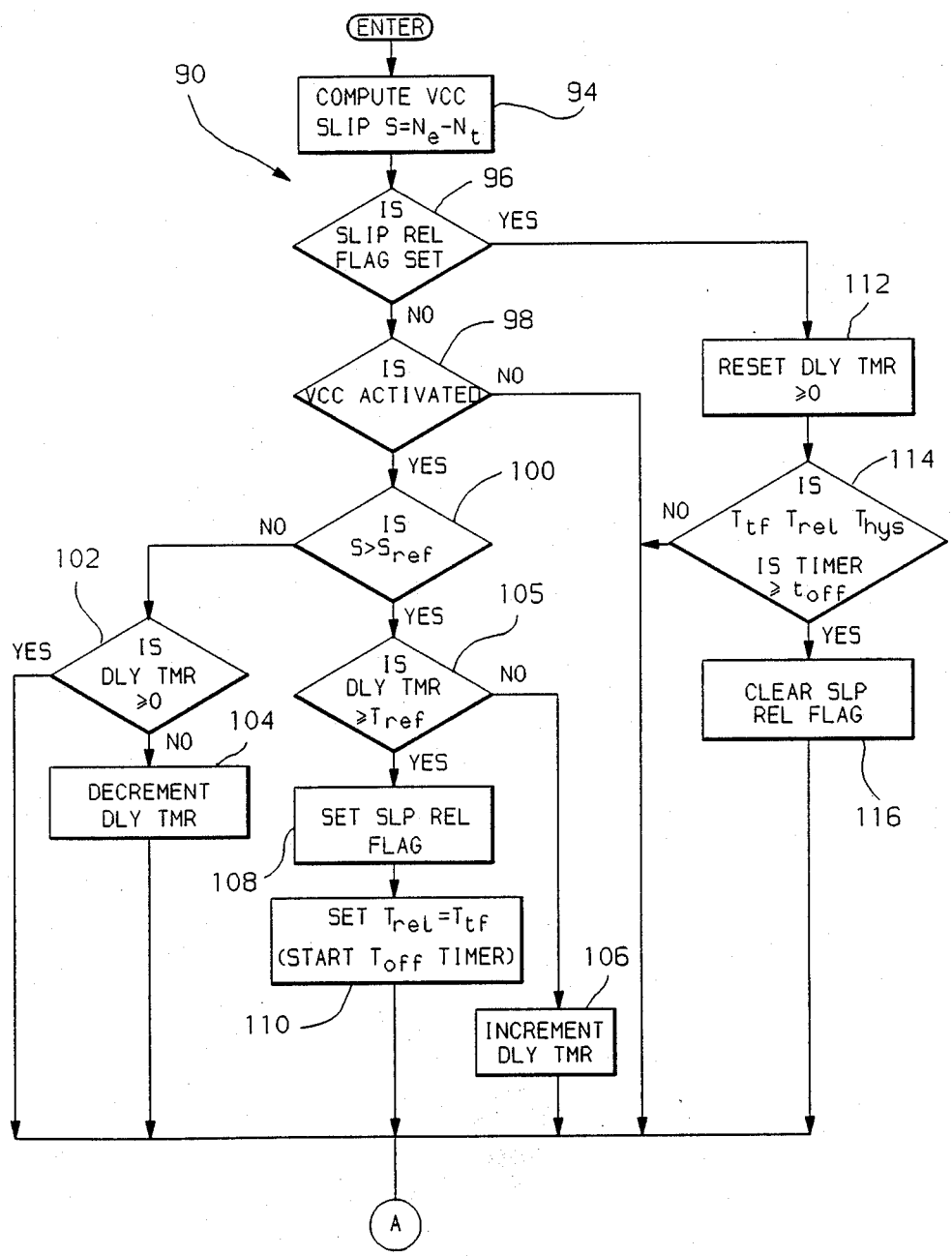
Figure 4B:
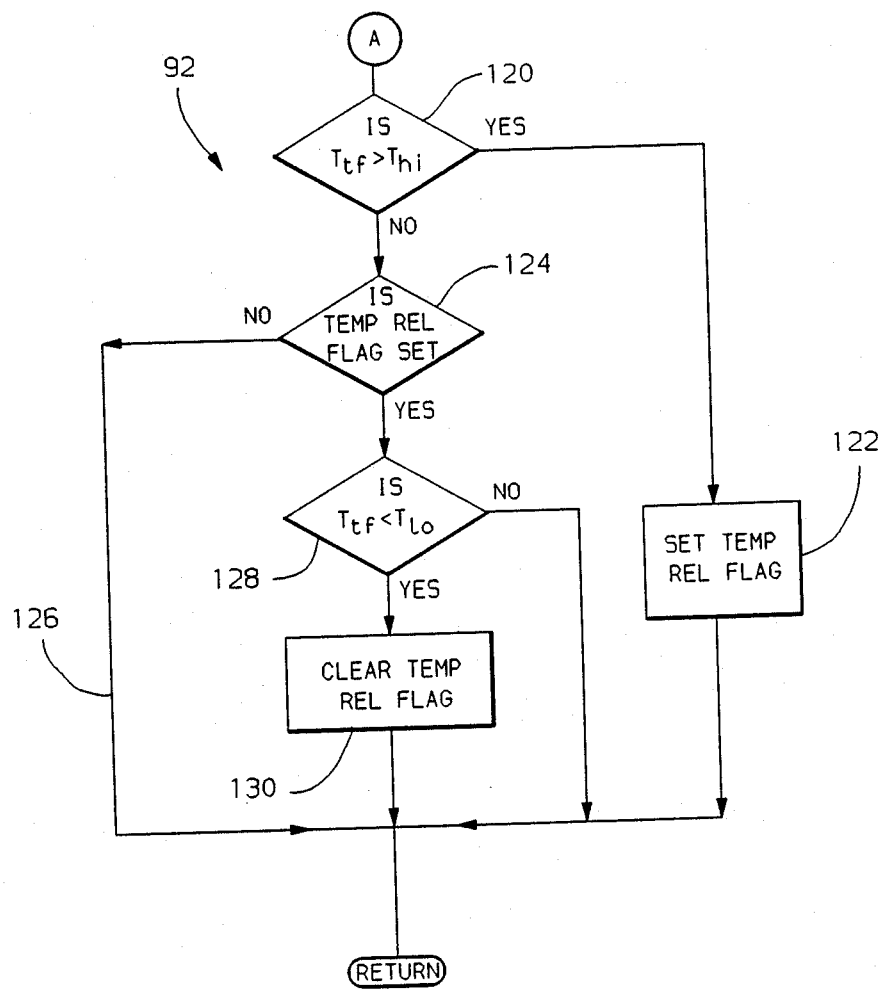

FIGS. 3–5 depict flow diagrams representative of computer program instructions executed by the computer-based control unit 60 of FIG. 1 in carrying out the control of this invention. The flow diagram of FIG. 3 represents an executive or main loop program which directs the operation of a number of subroutines for performing various tasks. The flow diagrams of FIGS. 4a, 4b and 5 represent the subroutines which are pertinent to the control functions of this invention, as indicated in FIG. 3.

Referring now more particularly to the main loop flow diagram of FIG. 3, the reference numeral 80 designates a series of program instructions executed at the initiation of each period of vehicle operation for initializing the various flags, timers and variables stored in the control unit 60. Thereafter, the instruction blocks 82–86 are repeatedly and sequentially executed as indicated by the flow diagram lines. The broken flow line between the blocks 82 and 84 indicates that the program also signals the execution of various other functions, such as engine fuel control, spark control, etc., which are not particularly relevant to the present invention.

At block 82, the control unit 60 reads the various input signals on conductors 62–70, as described in reference to FIG. 1. At block 84, the control unit 60 executes a VCC protection routine for carrying out the protection control of this invention, such routine being described in further detail in the flow diagram of FIGS. 4a-4b, as indicated. At block 86, the control unit 60 executes a VCC enable/disable routine for determining if the VCC 16 should be activated or released depending on the drivetrain operating parameters, read at instruction block 82, and the results of the VCC protection routine.

Referring first to the VCC protection routine of FIGS. 4a-4b, it will be seen that the flow diagram is functionally divided into two portions, designated by the reference numerals 90 and 92. The flow diagram portion 90 pertains to the slip related VCC release according to this invention. If a release of the VCC 16 is appropriate, a SLIP RELEASE FLAG is set; if a release is not appropriate or if reactivation of the VCC 16 is appropriate, the SLIP RELEASE FLAG is cleared. The flow diagram portion 92 pertains to a transmission fluid temperature related release of the VCC 16. If such a release is appropriate, a TEMPERATURE RELEASE FLAG is set; if such a release is not appropriate, the TEMPERATURE RELEASE FLAG is cleared.

Referring now more particularly to the flow diagram portion 90, the instruction block 94 is first executed to compute the VCC slip term S according to the difference between the engine speed $N_e$ and the turbine speed $N_t$. If the slip release flag is not already set (as determined at decision block 96) and the VCC 16 is activated (as determined at decision block 98), the decision block 100 is executed to compare the slip term S with the slip reference $S_{ref}$ defined in Graph B of FIG. 2. If the slip term S is less than or equal to the reference $S_{ref}$, the blocks 102 and 104 are executed to decrement the count in the delay timer DLY TMR if such count is not already equal to zero.

If the slip term S is greater than the slip reference $S_{ref}$, the blocks 105 and 106 are executed to increment the count in the delay timer DLY TMR until it equals or exceeds the time reference $T_{ref}$. When the count in the delay timer DLY TMR equals or exceeds the reference $T_{ref}$, the instruction block 108 is executed to set the SLIP RELEASE FLAG, indicating that a slip related release of the VCC 16 is appropriate. The instruction block 110 is also executed for the purposes of VCC reactivation. In a control according to the first embodiment of this invention, the release temperature term $T_{rel}$ is set equal to the current transmission fluid temperature reading $T_{tf}$, as indicated in the top unparenthesized line of instruction block 110. In a control according to the second embodiment of this invention, an interval timer, designated $T_{off}$ TIMER, is initialized to begin counting an interval having a duration of $T_{off}$ as defined in Graph E of FIG. 2, as indicated in the second or parenthesized line of instruction block 110.

Once the SLIP RELEASE FLAG is set (as determined at decision block 96), the instruction block 112 is executed to reset the count in the delay timer DLY TMR to zero. Then the decision block 114 is executed to determine if the VCC 16 should be reactivated. According to the first embodiment of this invention, the transmission fluid temperature $T_{tf}$ is compared to the release temperature term $T_{rel}$ less a hysteresis term $T_{hys}$, as indicated in the top half of the decision block 114. According to the second embodiment of this invention, the count in the $T_{off}$ timer is compared to the reference interval $T_{off}$ as indicated in the bottom half of the decision block 114. If the appropriate condition is satisfied, the instruction block 116 is executed to clear the SLIP RELEASE FLAG indicating that a slip release of the VCC 16 is no longer required. If the appropriate condition is not satisfied, the execution of instruction block 116 is skipped.

Referring now to the flow diagram portion 92, the decision block 120 is first executed to determine if the transmission fluid temperature $T_{tf}$ exceeds a first relatively high temperature reference $T_{hi}$. If so, instruction block 122 is executed to set the TEMPERATURE RELEASE FLAG indicating that a temperature related release of the VCC 16 is appropriate. If the transmission fluid temperature is not in excess of the high reference $T_{hi}$, and the TEMPERATURE RELEASE FLAG has not already been set (as determined at decision block 124), the remainder of the routine is skipped as indicated by the flow diagram line 126. If the TEMPERATURE RELEASE FLAG has been set, the transmission fluid temperature $T_{tf}$ is compared to a low temperature reference $T_{lo}$ as indicated at decision block 128. If the fluid temperature is less than the low reference $T_{lo}$, the instruction block 130 is executed to clear the TEMPERATURE RELEASE FLAG indicating that a temperature related release of the VCC 16 is not appropriate, completing the VCC protection routine.

Referring now to the VCC enable/disable routine of FIG. 5, the decision block 140 is first executed to determine if various VCC enable criteria are met. As indicated above, such criteria include drivetrain operating parameters such as engine speed, engine throttle position, coolant temperature, etc. If the criteria are not met, the instruction block 142 is executed to de-energize the VCC solenoid valve 48. If the criteria are met and either the SLIP RELEASE FLAG or the TEMPERATURE RELEASE FLAG are set (as determined at decision blocks 144 and 146), the instruction block 142 is also executed to de-energize the VCC solenoid valve 48. If the VCC enable criteria are met and neither of the SLIP RELEASE and TEMPERATURE RELEASE FLAGS are set, the instruction block 148 is executed to energize the VCC solenoid valve 48 to activate the VCC 16.

In the above manner, the control method of this invention provides a reliable protection of the VCC 16 without requiring the measurement of fluid temperature internal to the VCC. The parameters required to mechanize the method of this invention are easily measured and may already be available depending upon the sophistication of the drivetrain controls, resulting in a practical and relatively inexpensive technique for protecting the VCC. In mechanizations of the control methods of this invention, the following values were assigned to the reference terms.

$S_{ref}$—275 rpm
$t_{ref}$—60 seconds
$T_{hys}$—10 degrees C.
$T_{off}$—10 minutes While this invention has been described in reference to the illustrated embodiments, various modifications thereto will occur to those skilled in the art and it will be understood that systems incorporating such modifications may fall within the scope of this invention which is defined by the appended claims.

The embodiments of the invention in which an exclusive property or privilege is claimed are defined as follows:

1. In a motor vehicle drivetrain having first means including a fluidic torque converter defining a relatively high slip torque transmission path between a vehicle engine and transmission gearset, second means including a viscous converter clutch (VCC) activatable to define an alternate, relatively low slip, torque transmission path between said engine and transmission gearset, and control means for selectively activating said second means in accordance with drivetrain operating parameters to improve drivetrain efficiency, a method of operation for said control means which protects the VCC from damage due to internal overheating, the method comprising the steps of:

measuring a VCC slip parameter according to the speed difference between the engine and transmission gearset during activation of said second means;

developing a net overslip indicator having a value which changes in the direction of a first limit value so long as the measured slip parameter is at least as great as a reference slip value indicative of excessive VCC slippage, and which changes in the direction of a second limit value so long as the measured slip parameter is less than said reference slip value; and temporarily deactivating said second means without regard to said drivetrain operating parameters when said net overslip indicator value reaches said first limit value to permit cooling of the VCC.

2. The method set forth in claim 1, wherein said second means is deactivated for a predetermined time interval when said net overslip indicator reaches said upper limit.

3. In a motor vehicle drivetrain having first means including a fluidic torque converter defining a relatively high slip torque transmission path between a vehicle engine and transmission gearset, second means including a viscous converter clutch (VCC) disposed in a fluid cavity of said torque converter, activatable to define an alternate, relatively low slip, torque transmission path between said engine and transmission gearset, and control means for selectively activating said second means in accordance with drivetrain operating parameters to improve drivetrain efficiency, a method of operation for said control means which protects the VCC from damage due to internal overheating, the method comprising the steps of:

measuring a VCC slip parameter according to the speed difference between the engine and transmission gearset during activation of said second means;

developing a net overslip indicator having a value which changes in the direction of a first limit value so long as the measured slip parameter is at least as great as a reference slip value indicative of excessive VCC slippage, and which changes in the direction of a second limit value so long as the measured slip parameter is less than said reference slip value;

when said net overslip indicator value reaches said first limit value, deactivating said second means without regard to said drivetrain operating parameters and storing a deactivation temperature indication corresponding to the temperature of the torque converter fluid at the time of such deactivation; and permitting reactivation of said second means in accordance with said drivetrain operating parameters after the temperature of the torque converter fluid falls below a value determined in relation to said stored deactivation temperature.

* * * * *